US005565826A

United States Patent [19]
Karlström

[11] Patent Number: 5,565,826
[45] Date of Patent: Oct. 15, 1996

[54] OVERLOAD PROTECTIVE SYSTEM

[76] Inventor: Per Olof Karlström, Gideonsbergsgatan 5 B, S-722 25 Västerås, Sweden

[21] Appl. No.: 318,789

[22] Filed: Oct. 14, 1994

[51] Int. Cl.$^6$ ................................................. H01H 75/00
[52] U.S. Cl. ................................ 335/16; 361/58; 218/22
[58] Field of Search .......................... 335/16, 147, 195; 361/58, 59; 218/22, 24, 26

[56] References Cited

U.S. PATENT DOCUMENTS

| | | |
|---|---|---|
| 2,752,558 | 6/1956 | Kane . |
| 3,509,296 | 4/1970 | Harshman et al. . |
| 4,163,204 | 7/1979 | Sado et al. . |
| 4,630,014 | 12/1986 | McClellen et al. .................. 335/147 |
| 4,635,012 | 1/1987 | Kohanawa et al. ................... 335/16 |
| 4,636,762 | 1/1987 | Marquardt et al. ................. 335/195 |
| 4,835,501 | 5/1989 | Hovanic ............................. 335/16 |

FOREIGN PATENT DOCUMENTS

| | | |
|---|---|---|
| 0267544 | 11/1987 | European Pat. Off. . |
| 9013800 | 11/1990 | WIPO . |

*Primary Examiner*—Lincoln Donovan

[57] ABSTRACT

The protective device for protecting against over currents in electric circuits includes at least one electrically conductive body and two electrodes which function to supply circuit current through the conductive body and which lie against the conductive body at corresponding positions either directly or through the medium of an intermediate part. An abutment pressure is applied to the electrode so that the electrodes are maintained in abutment at the corresponding positions of the conductive body. When the devices are subjected to high short circuiting currents, the current density in the deformed abutment surfaces of the conductive body will increase, thus increasing the resistance of the device.

11 Claims, 7 Drawing Sheets

OVERLOAD PROTECTIVE SYSTEM

TECHNICAL FIELD

The present invention relates to a protective device for protecting against overcurrents in electric circuits.

BACKGROUND ART

Current limiting elements, or when using the terminology of the art, short circuiting protectors are mainly comprised of fuses and circuit-breakers which most often possess current limiting properties. The technique is known to the art and several standards, such as IEC 269 concerning fuses, and IEC 947-2 concerning circuit-breakers, have been instituted. The short-circuiting protector is excited by the short circuiting currents flowing therethrough. The shortcircuiting protector is excited in accordance with two main principles and is therefore divided here into the following groups 1 and 2:

1. Fuses, thermistors with positive temperature coefficients and self-restoring short-circuiting protectors described in U.S. Pat. No. 3,886,551 are excited when short-circuiting currents flow therethrough as a result of the increased ohmic power development in the protector. When the applied electrical energy has caused a temperature increase in the protector corresponding to the melting point of vital material in the protector an increase in resistance occurs and limitation of the short-circuiting current begins.

2. Arc-based, current limiting cut-outs, for instance circuit-breakers are excited directly, through the conversion of magnetic energy to mechanical energy, by electrodynamic current forces occurring on the electrical contact system included in the circuit-breaker, or indirectly through the medium of a separate excitation device comprised of an electromagnetic release device, a so-called "plunger or schlagstiftanordnung", which is also excited by the main current. An armature included in a magnetic circuit acts on the electrical contact system and/or on a spring mechanism release device which performs an on/off-function. Remote control is also used, for instance in contactors, for maintaining two stable mechanical states of equilibrium, on and off respectively. Electrical contact systems in which electrodynamic current forces act directly on the electrical contacts are earlier known to the art, for instance from Patent Specifications GB 1,519,559, GB 1,489,010, GB 1,405,377.

Hybrids in which the two principles are used are disclosed in Patent Specification GB 1,472,412 and in the article "A New PTC Resistor for Power Applications" by R. S. Perkins, et al, published in the journal IEEE Transactions on Components, Hybrids and Manufacturing Technology, Vol. CHMT-5, No. 2, June 1982, pages 225–230 and publications U.S. Pat. No. 3,249,810 and DE 35 446 47, among others.

One serious drawback with short-circuiting protectors according to groups 1 and 2 above, particularly in the case of high and steep (=rapidly growing) short circuiting currents, resides in the high intrinsic inertia. Thermal inertia has a limiting effect on the short-circuiting protectors described under group 1 above whereas in the case of arc-based circuit-breakers it is the mechanical inertia, i.e. the mass inertia, which becomes significant when wishing to separate the electrical contacts quickly. As a result of the mass inertia, the arc is delayed on the electrical contacts in arc-based circuit-breakers, and consequently the arc voltage, important in achieving current limitation, will not reach the values at which the otherwise monotonously growing short circuit current is limited until a relatively long delay time (ms) has lapsed. Furthermore, a very high contact pressure, proportional to the square of the rated or nominal current of the apparatus, is required in order for the electrical contacts to be able to carry rated current under normal operating currents. This also prevents the electrical contacts from separating quickly, since the contact pressure is opposed to the electrodynamical repelling and separating forces.

The possibility of adjusting the sensitivity of the short-circuiting protectors described under categories 1 and 2 above is highly limited. Consequently, there is required a comprehensive coordination work with main and subordinate protectors included in electric circuits. Standards have therefore been worked-out, for instance DIN 57636 Teil 21/VDE 0636 Teil 21 § 7,12 and IEC 947-2, since erroneous coordination may, among other things, incur selectivity problems which are difficult to rectify (adjust) in existing systems.

As a result of the aforesaid drawbacks, and in particular inertia, short-circuiting protectors based on the principles disclosed in categories 1 and 2 above are less suited as short-circuiting protectors or current transient protectors for thyristors or electronic equipment, since they are sensitive to both high current derivatives and high short-circuiting currents can also occur in capacitive circuits or inductive motor circuits with high presumptive short-circuiting currents. Typical values of presumptive short-circuiting currents are $I_k$=50–100 kA and corresponding current time derivatives from 22–44 kA/ms. With a rated current of 100 A, a conventional fuse will then allow a current peak of about 16 kA and $\int i^2 \cdot dt \approx 20$ kA$^2$s to pass through, which greatly exceeds the permitted values of corresponding thyristors. Consequently, chokes are often included in thyristor circuits in order to reduce current derivatives, therewith enabling the aforedescribed short-circuiting protector to be used.

A self-restoring short-circuiting protector is mainly comprised of so-called thermistors. The expression PTC-element is an accepted designation of thermistors whose resistivity has a Positive Temperature Coefficient.

Electrically conductive polymer compositions, particularly PTC-compositions, and devices in which PTC-compositions are included are known to the art. Reference in this regard can be made to U.S. Pat. Nos. 2,978,665, 3,351,882, 4,017,715, 4,177,376 and 4,246,468, and also to U.K. Patent No. 1,534,715. Later developments are described, for instance, in German Patent Nos. 2,948,350, 2,948,281, 2,949,174 and 3,002,721, and also in various Patent Applications, such as U.S. Ser. Nos. 41,071 (MPO 295), 67,207 (MPO 299) and 88,344 (MPO 701), and patent applications such as U.S. Ser. Nos. 141,984 (MP=712), 141,987 (MPO 713), 141,988 (MPO 714), 141,989 (MPO 715), 141,991 (MPO 720) and 142,054 (MPO 725).

One problem with PTC-elements is that when heated by the current flowing therethrough and the temperature is reached at which the PTC-elements become self-adjusting, the voltage is taken over by a fragment of the PTC-element and the fragment is subjected to very high stresses, which are liable to destroy the PTC-element. PTC-embodiments in which this problem is eliminated are known, for instance, from European Patent EP 0,038,716. PTC-elements for overload protectors are often constructed of a polymeric material, for instance high-pressure polyethylene, Containing particles of an electrically conductive material, for instance lamp black or carbon black, and exhibit a resistivity with high positive temperature coefficient.

Ceramic thermistors which exhibit PTC-characteristics are known from Patent Publication GB-A-1,570,138. The most common ceramic thermistors are based on $BaTiO_3$ or $V_2O_3$.

One advantage afforded by the polymer-based thermistor in comparison with the ceramic thermistor is that its resistance increases monotonously with temperature. It is also relatively cheap to produce. However, commercially available polymer-type thermistors are designed for relatively low rated or nominal voltages and cannot therefore be used readily in distribution networks for instance. Furthermore, the configuration and electrode connections of the thermistors are normally such that the thermistors are subjected to large repulsion forces at high short-circuiting currents, as a result of anti-parallel current paths, therewith tearing the electrodes apart. It is also known that sandwich-type, polymer-based PTC-elements do not return to the initial resistance after passing from a low resistive state to a high resistive state. In more serious cases, when the PTC-elements are subjected to very high electrical stresses, such as short-circuiting currents, bubbles and cracks form in the central parts or in other parts of the polymer composition of the PTC-element, so that the element will no longer function, i.e. the element is destroyed.

For these reasons, polymer-based thermistors have not hitherto been used to any appreciable extent in practice within electric power technology, but have mainly only been used to protect electronic equipment, although the thermal inertia limits the fields of possible application.

An essential difference between thermistors and fuses is that thermistors will self-restore after a short-circuit, i.e. thermistors can be reused after a short-circuit, which also applies to circuit-breakers.

Elastomers are comprised of all polymers that exhibit elastic properties which are similar to those exhibited by natural rubber. Elastomers can be compressed or stretched within a relatively large permitted elastic area, and return to their original state when the load is removed. Electrically conductive elastomers are a class of rubber and plastics which have been made electrically conductive, either by the addition of metal mixtures or by orientating metal fibres under the influence of electric fields, or by the addition of different carbon mixtures or ceramics, for instance V2O3-material dispersed in the manner described in the article "V2O3 Composite Thermistors" by D. Moffat, et al, published in Proceedings of the Sixth IEEE International Symposium on Applications of Ferroelectrics, 1986, pages 673–676. In rubber, there, is used several types of "carbon black", for instance graphite, acetylene black, lampblack and furnace black with particle diameters ranging from 10–300 nm. Examples of appropriate rubber materials which become electrically conductive after adding metal mixtures or carbon mixtures are butyl, natural, polychloroprene, neoprene, EPDM, and the most important silicone rubber. Additives of metals and metal alloys in powder form suited as elastomer additives are silver, nickel, copper, silver-plated copper, silver-plated nickel, and silver-plated aluminium.

Electrically conductive elastomer are used as pressure transducers within transducer technology. The electrical properties are changed when electrically conductive elastomers are deformed, for instance as a result of being subjected to pressure or tension, which manifests in a change in resistance.

The most common types of carbon or metal-filled plastics are polyethylene and polypropylene. These are used at present for heating cables and for overload protectors, for instance the earlier mentioned polymer-based PTC-thermistors.

However, the inclusion of an electrically conductive filler impairs the mechanical properties of the plastic. The material becomes brittle and hard and is therewith not readily deformed. These materials are therefore unsuitable as pressure transducers and also require a relatively complicated contacting technique for PTC-applications. A further limitation of carbon-filled plastics resides in their relatively high resistivity, which is typically one 1 Ohmcm and higher. On the other hand, metal-filled plastics can be produced with significantly lower resistivity, lower than 0.5 Ohmcm, although voltage or tension stability becomes very poor, and consequently these materials are not suited as overload protectors.

Electrically Conductive elastomers can be given very low resistances, for instance resistances of 2 mOhmcm or lower, by admixing metal powder. One advantage afforded by elastomers is that they are very soft in comparison with carbon-filled polyethylene and polypropylene, even when containing large quantities of electrically conductive filler. Such elastomers will have a typical Shore number of between 20–80, according American Standard ASTM D2240 (Q/C).

SUMMARY OF THE INVENTION

The object of the present invention is to provide a relatively simple and inexpensive overload protector which is able to limit the highest short-circuiting currents that occur in a low voltage network, even at very high current derivatives, and the release characteristic of which, i.e. its response sensitivity, can be adapted readily to the object to be protected. This object is achieved in accordance with the invention with a protective device having the characteristic features set forth in the following embodiment.

By deforming at least one curved or convex-defining surface of an electrically conductive elastomeric body included in the current limiting element with the aid of a pressure means, and by integrating electrodes which are active in conducting current through the current limiting element, there is achieved a significantly more effected current limitation than that obtained with conventional short-circuiting protectors described under the heading "Background Art". This results in considerable cost advantages, particularly on the downstream side of the current limiting element. The device can replace both conventional fuses and so-called automatic circuit-breakers (MCB), and possesses the advantages afforded by both of these types of circuit-breaker without suffering their disadvantages, such as the limited length of life of the fuse and the limited circuit breaking ability of the automatic circuit-breaker on short-circuiting occurrences.

The device which functions as a current limiting element includes at least one electrically conductive elastomeric body and two electrodes. The polymer composition of the elastomeric body may be of any known kind and forms no part of the present invention. Examples of suitable elastomers in this respect are particularly butyl, natural, polychlorpropene, neoprene, EPDM and silicone rubber. The electroconductive powder material is preferably comprised of silver, nickel, cobalt, silver-plated copper, silver-plated nickel, silver-plated aluminium, lampblack, conductive soot or carbon black. The powder material will suitably have a particle size of 0.01–10 micro-meters and the powder filler is suitably present in an amount corresponding to 40–90% of the combined weight of the powder filler and elastomeric material. The resistivity of the electric elastomeric body will preferably lie within the range of 0.1 mohmcm–10 Ohmcm.

When the device includes more than one electrically conductive elastomeric body, the bodies may be made of mutually the same or mutually different elastomers and then with mutually the same or mutually different fillers and resistivity. The electrodes are of a conventional kind, for instance silver-plated copper. The electrodes are preferably orientated so that repulsion forces will occur between the electrodes when high currents pass therethrough. The pressure achieved on the electrodes, for instance with a known pressure device described in U.S. Pat. No. 3,914,727, or by a conventional spring mechanism for the on/off function of an electric switch, deforms the convex abutment surface of the elastomeric body, when the device includes such an abutment surface. This deformation will preferably reach at least 5%. A deformation of 5–30% is particularly preferred, as defined with a starting point from the distance between the bodies that borders on a considered elastomeric body, i.e. if the distance when the pressure is 0 and bordering bodies lie in abutment with the elastomeric body is d and if the distance changes to 0.7·d after the pressure has been applied, the body will have been deformed by 30%. Particularly preferred elastomeric bodies are those which have a hardness between 30–50 IRHD in accord with British Standard BS903/A26, although materials having both a lower and a higher hardness may conceivably be used.

According to one particularly preferred embodiment of the invention, the pressure device is provided with pressure exerting means which have spring properties. A spring device of this preferred construction greatly facilitates separation and therewith reduction of the transition area between the convex abutment surface of the elastomer bodies, when such an abutment surface is included, and bordering body.

According to one particularly preferred embodiment of the invention, when only one electrically conductive elastomeric body is included in the current limiting element this elastomeric body is inserted between a slotted electrically insulating plate. The elastomeric body is placed in the slot and is enlarged so as to fill the slot when subjected to pressure. In this way, there is obtained an electric isolator which prevents electric flashover in the event of a short-circuit.

According to another embodiment of the invention, one elastomeric body is stacked on another elastomeric body in accordance with the invention, in the same pressure device.

According to still another embodiment of the invention, the elastomeric body is cavitary and can be deformed by much more than 30%, the extent of deformation depending on the diameter of the cavity. The advantage with this solution is that a relatively hard elastomeric material can be used while still enabling the body to be significantly deformed.

It has been found possible by means of the present invention to counteract or totally eliminate the drawbacks described under the heading "Background Art", such as insensitivity, etc., of the overload protector. The resistance of the current limiting element changes when high short-circuiting currents occur at a lower energy development, therewith reducing the thermal and mechanical inertia. Furthermore, subsequent to having passed from a low-resistive to a high-resistive state, the current limiting element will return to the original resistance and is therewith reusable even after being subjected to thee effect of short-circuiting currents. One conceivable reason for the result achieved by the present invention may be as follows: With the normal passage of current, a low transition resistance is maintained between those elements which are in contact with one another through the transition surface which is formed when the body having a convex abutment surface or the bodies, when more than one such body is included, are deformed by an external pressure device. When high short-circuiting currents occur, the electrodes will separate as a result of current forces. Furthermore, so-called striction forces occur in the transition between the convex abutment surface of the elastomer bodies, when one such abutment surface is included, and bordering bodies, due to the configuration of the preferred abutment surface. This results in a reduction of the abutment surface, partly because an elastomeric body having a convex abutment surface can be deformed and partly because the electrodes will separate. As a result, energy development increases more rapidly in the decreasing transition surface, causing the resistance of the elastomeric body at the transition surface to considerably increase without the remainder of the elastomeric body being subjected to impermissibly high stresses. Furthermore, as a result of the cross-sectional configuration of the preferred elastomeric body, the current density is greatest along the symmetry line of the cross-sectional surface between the electrodes, meaning that the material is under the greatest stress in this region, therewith preventing the formation of cracks and bubbles in the cross-section at right angles to the current direction.

Among other things, the following advantages are obtained in a current limiting device when the physical properties described in the Background Art are combined, for instance such properties as pressure response of electrically conductive elastomers, transition surfaces, the electrodynamic repulsion effect that is achieved by suitable geometric configuration of electrically conductive elastomeric bodies and electrodes, together with a suitable choice of electrode material:

a) Considerably increased sensitivity at high current derivatives and short-circuit currents due to a resilient pressure device and preferred electrode configuration, which together with the particularly configured electrically conductive elastomeric body will repeal the electrodes.

b) The device can be made very low-ohmic, because of deformation of the contact transition between electrically conductive elastomeric body and electrode.

c) A smaller selectivity problem in electric circuits which include main and subordinate protectors.

d) The element returns to its initial resistance after passing from a low-resistive state to a high-resistive state.

e) A simple circuit breaking device which may possibly not require the provision of arc shields when the electrodes are connected mechanically to a conventional on/off mechanism for circuit-breakers which in the on-position maintain the requisite pressure between electrode (=contact) and electrically conductive elastomeric body.

f) Eliminated welding risk when a circuit-breaker arrangement according to point e) above is included.

g) A vibration-insensitive and rebound-insensitive switch-on function.

h) The possibility of adjusting the sensitivity of the device when the pressure maintained by the pressure device can be adjusted and varied in a known manner, thereby enabling one and the same overload protector to be used in an extended rated current range.

i) Very small external dimensions, since the electrically conducting elastomer material can be given a very low resistivity <1 mohmcm.

j) The provision of exclusive chokes in thyristor circuits can be avoided.

BRIEF DESCRIPTION OF THE DRAWINGS

The present invention will now be described in more detail with reference to exemplifying embodiments thereof and also with reference to the accompanying drawings, in which.

DETAILED DESCRIPTION OF THE PREFERRED EMBODIMENTS

Figure 1A:
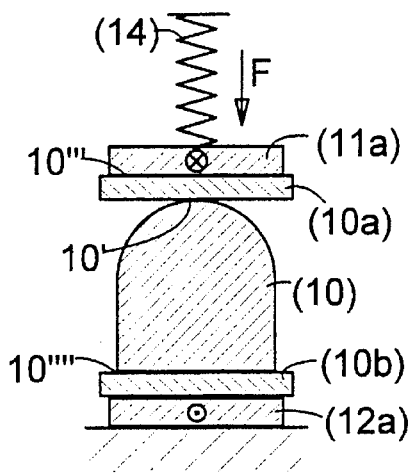
FIGS. 1a–c are central sectional views of three preferred embodiments of one part of the invention, this part mainly comprising electrically conductive elastomeric bodies and electrodes.
Figure 1B:
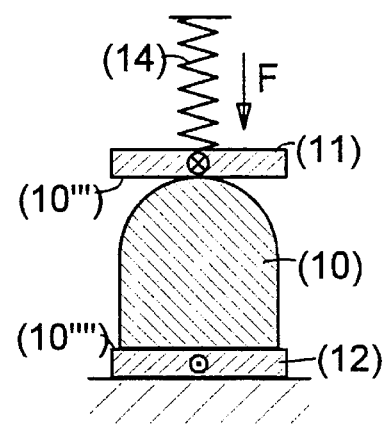
Figure 6:
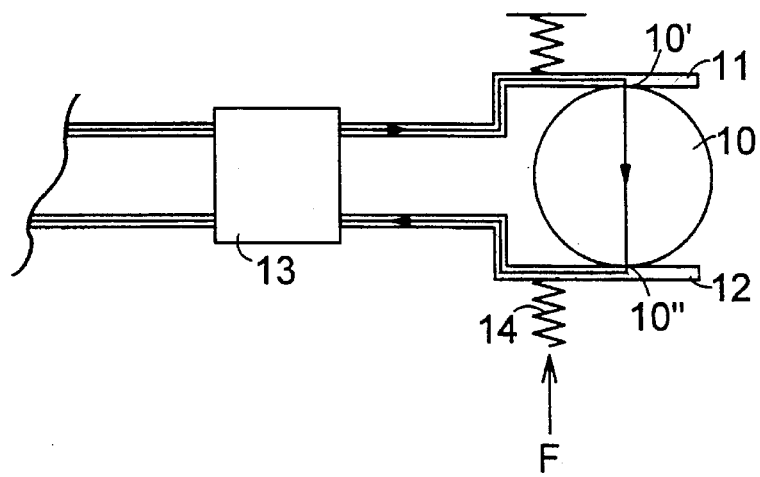
FIGS. 6–7 are central sectional views of an inventive elastomeric body and associated electrodes, and also a repulsion means.

FIG. 6 illustrates a current limiting element in accordance with an arrangement analogous with the arrangement illustrated in FIG. 1b. The current limiting element includes a centrally mounted body (10) in the form of a homogenous cylinder having a diameter of 3 mm and length of 10 mm and being made of a deformable electrically conductive elastomer material, for instance comprising 80 percent by weight silver powder and 20 percent by weight silicone plastic, and two mutually parallel electrodes (11, 12) which are tangential to the body (10) on opposite sides thereof. In the case of the illustrated embodiment, the elastomeric body (10) has a Shore number of 40 according to BS 903/A26. The electrodes (11, 12) are comprised of angled, silver-coated copper plates having a thickness of 0.7 mm. The electrodes are held in abutment with the body (10) with the aid of a spring device (14) which exerts pressure on the electrodes (11, 12) in a known manner and therewith deform the abutment surfaces (10', 10") of the body against respective electrodes, this deformation being about 30%. The sensitivity or response of the arrangement can be enhanced by including a repulsion device (13) of the kind described, for instance, in GB 1,519,559 or GB 1,489,010, or the electrodes may be constructed so that they themselves will give rise to repelling electrodynamic current forces.

Figure 3:
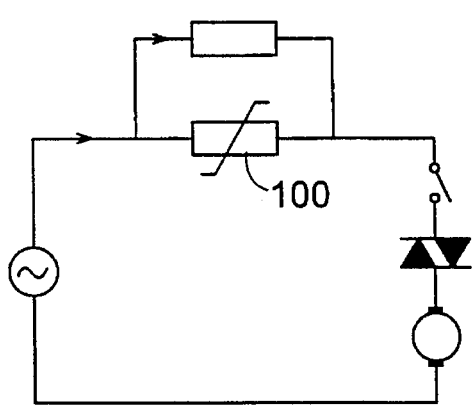
FIG. 3 illustrates one embodiment of an inventive current limiting element connected in an electric circuit.
Figure 4:
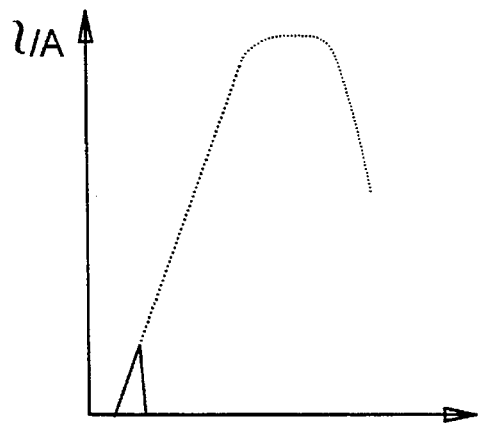
FIG. 4 illustrates the course of the current in the event of a short-circuit with an element according to FIG. 3.
Figure 5:
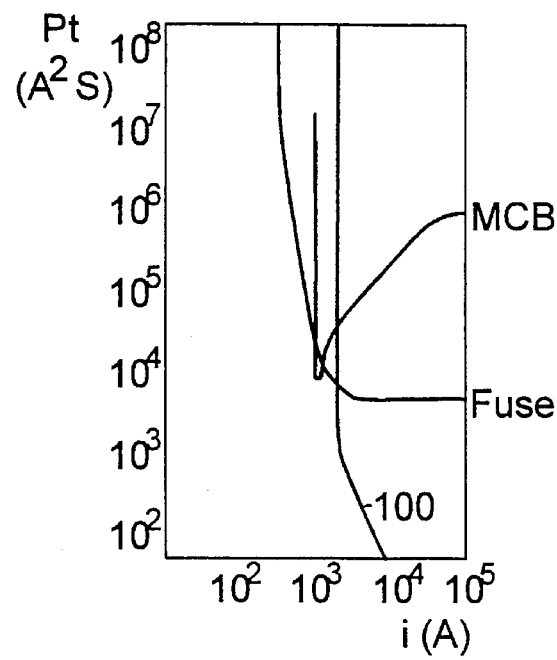
FIG. 5 shows a comparison between $\int i^2 \cdot dt$ curves for an inventive current limiting element and a conventional protector, such as a fuse and circuit-breaker, MCCB.

Alternatively, the repulsion device (13) may be a self-activating magnetic circuit of the kind earlier described in U.S. Pat. No. 4,513,270, which is intended to act solely on one electrode and which is directed so that the electrodes will separate from one another under the action magnetic forces or electrodynamic current forces. The resistance across the device is 2 mOhm. When the device is subjected to high short-circuiting currents, preferably currents above 50 A, and more particularly above 500 A, the current density will increase in the deformed abutment surfaces (10', 10"), wherewith the resistance in the element will increase to 100 mOhm or more. This is sufficient to limit short-circuiting currents in low voltage systems, which through the agency of the preferred arrangement in FIG. 6 and the circuit illustrated in FIG. 3 limits the short-circuiting currents and produces the current-time diagram shown in FIG. 4.

Figure 1C:
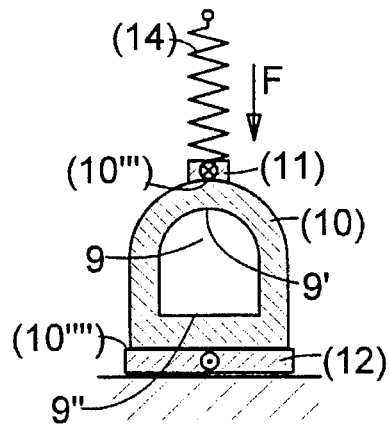
Figure 2:
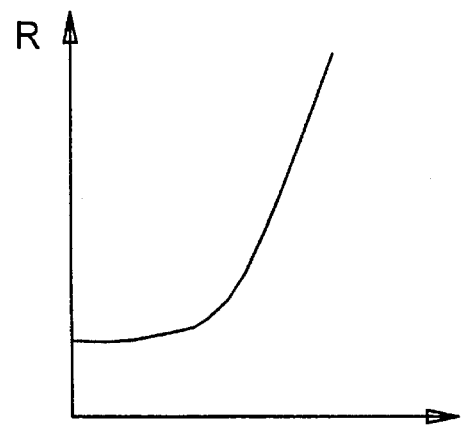
FIG. 2 illustrates the resistance R as a function of the distance d between two electrodes between which an electrically conductive elastomeric body of semi-cylindrical cross-section of radius r is compressed.
Figure 7:
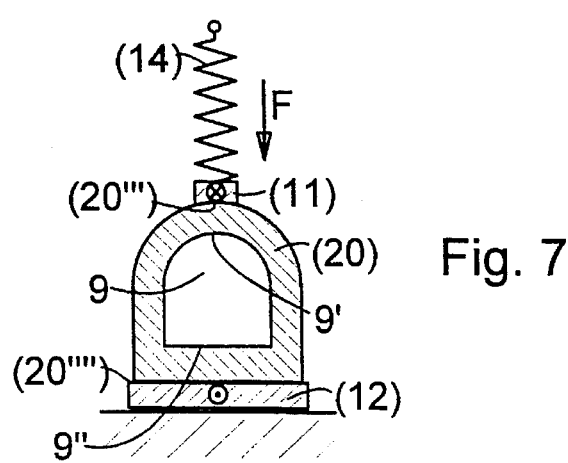

FIG. 7 illustrates a current limiting element which is similar to the element illustrated in FIG. 6 and FIG. 1c with the exception that the elastomeric body (20) is not an homogenous body. Thus, the body of the FIG. 7 embodiment includes a cavity (9) which enables deformation of the elastomeric body to be increased to 30% or more, depending on the dimensions of the cavity. This enables a material of relatively high Shore number to be used, for instance a Shore number of 80. The body (20) is preferably deformable so that the resultant convex abutment surface (9') will be in physical contact with the abutment surface (9").

Figure 8:
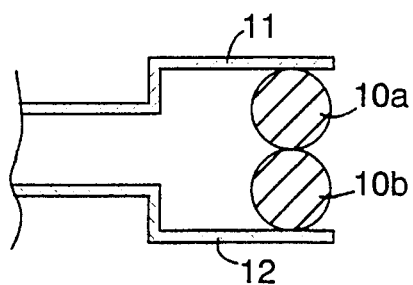
FIGS. 8–19 illustrate further variants of inventive current limiting elements.
Figure 9:
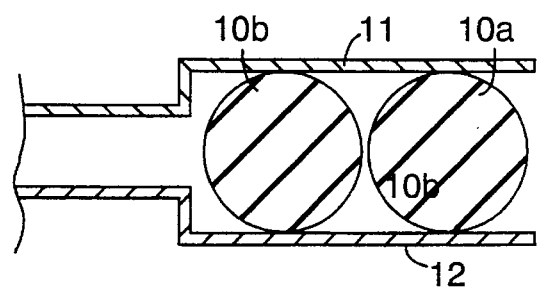

FIG. 8 illustrates an embodiment of the invention in which two electrically conductive elastomeric bodies (10a, 10b) have been stacked one upon the other, whereas the electrically conductive elastomeric bodies (10a, 10b) of the FIG. 9 embodiment have been placed side-by-side.

Figure 10A:
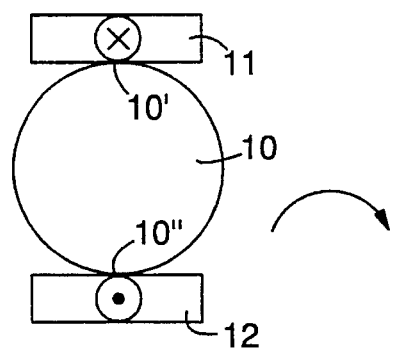
Figure 10B:
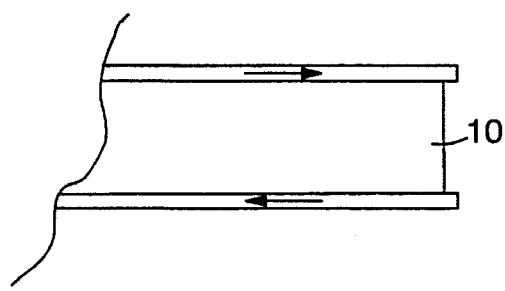

FIGS. 10a–b illustrate an inventive device in which an electrically conductive elastomeric body (10) according to FIG. 7 is placed between two electrodes (11, 12) which extend longitudinally parallel with the body (10). The pressure applied to the electrodes and the elastomeric body abutment surfaces (10', 10") is obtained through the agency of the earlier described resilient pressure device.

Figure 11:
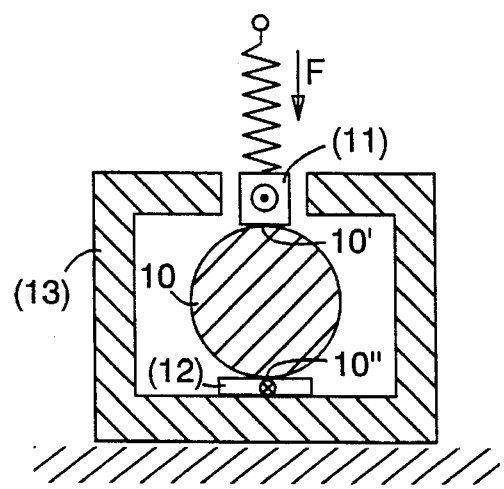

FIG. 11 illustrates an inventive device in which an electrically conductive elastomeric body (10) is placed between two electrodes (11, 12) according to FIGS. 10a–b. A ferromagnetic repulsion circuit (13) surrounds the longitudinally extending electrodes (11, 12) and the elastomeric body (10), and amplifies the repulsion effect of electrode (11) when overcurrents flow through the current limiting element. Pressure is applied to the electrodes and the elastomeric body abutment surfaces (10', 10") by the aforedescribed resilient pressure device.

Figure 12:
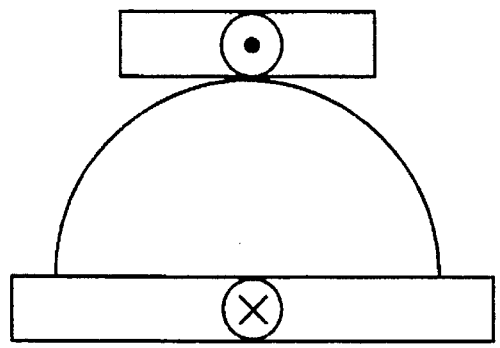

FIG. 12 illustrates a device which is analogous with the device shown in FIGS. 10a–b with the exception that the electrically conductive elastomeric body (10) is semi-cylindrical in shape and may be firmly anchored to the electrode (12) by means of an electrically conductive adhesive, or may lie free.

Figure 13:
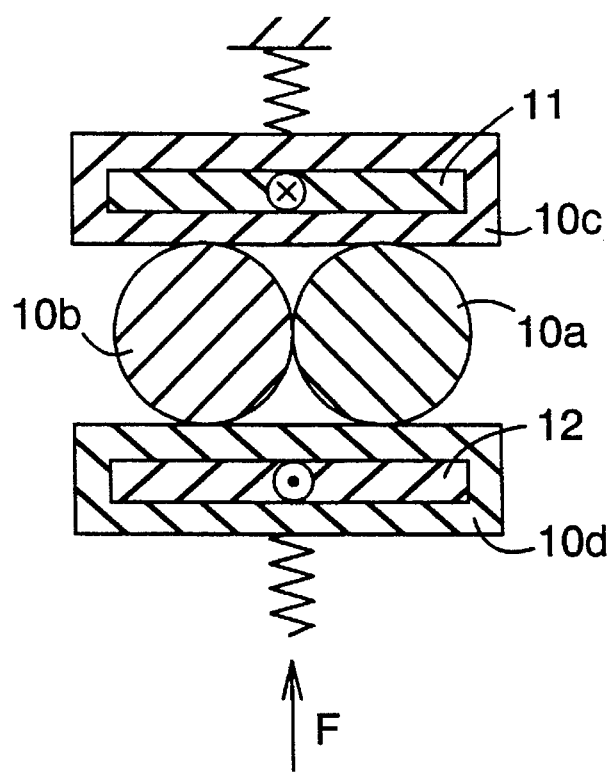

FIG. 13 illustrates an inventive device in which two electrically conductive elastomeric bodies (10a, 10b) are placed between two electrodes (11, 12), between which a further two elastomeric bodies (10c) and (10d) respectively have been placed, these further bodies surrounding the electrodes (11, 12). Pressure is applied to the electrodes, and particularly to the elastomeric bodies provided with convex end-surfaces, by the aforesaid, known pressure device.

Figure 14:
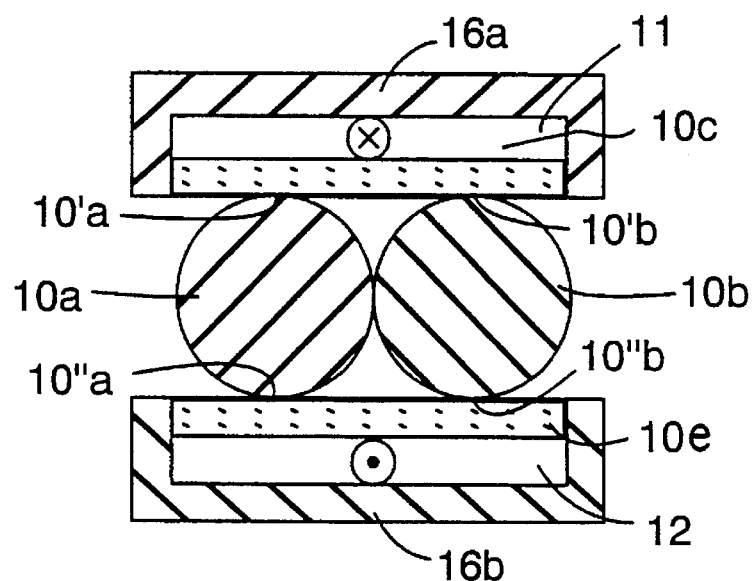

FIG. 14 illustrates a further embodiment of the invention according to the FIG. 12 and FIG. 9 embodiments, in which the elastomeric bodies (10c, 16a) and (10e, 16b) respective surrounding electrodes (11, 12) are comprised respectively of electrically conductive elastomer material (10c, 10e) and electrically insulating elastomeric material (16a, 16b). The respective elastomeric bodies (10c, 16a) and (10e, 16b) are advantageously moulded in a two-part mould, so that the elastomeric bodies will be mutually joined, and the electrodes are electrically insulated. The electrical connections to the electrodes are not shown in the Figure.

Figure 15:
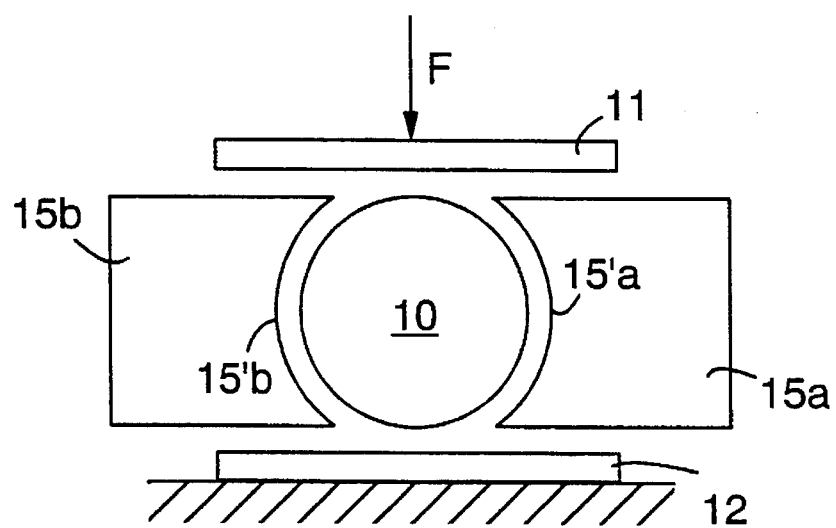

FIG. 15 illustrates an inventive device according to FIGS. 6 and 7, in which two electrically insulating, polyethylene bodies (15a, 15b) are disposed parallel with an electrically conductive elastomeric body (10). When the device is subjected to pressure, as symbolized by the force F acting on the electrodes (11, 12), the body (10) is deformed and will therewith lie against the defining surfaces (15a') and (15b') of the electrically insulating bodies. There is obtained in this way an electric insulation which prevents flashover in the event of a short-circuit, at the same time as the electrically conductive elastomeric body will not flow outwards, which is otherwise a common problem.

Figure 16:
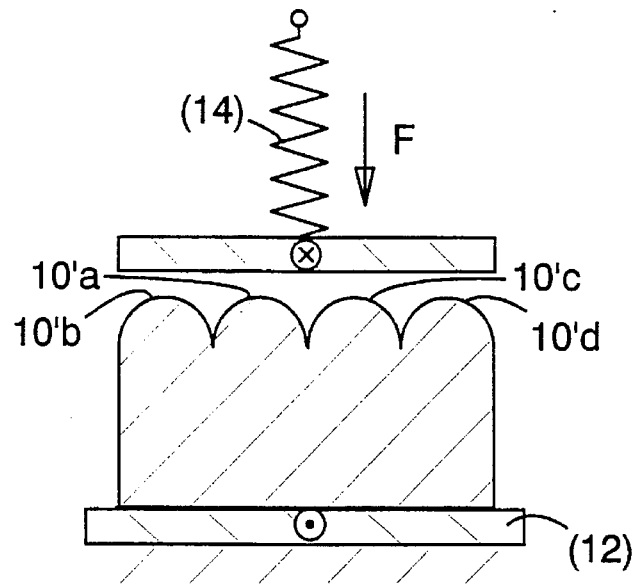

FIG. 16 illustrates an inventive device in which the electrically conductive elastomeric body (10) includes several convex deformable abutment surfaces (10a', 10b', 10c', 10d'), comprising several integrated elastomeric bodies according to earlier Figures. The elastomeric body (10) is coherent and homogeneous.

Figure 17:
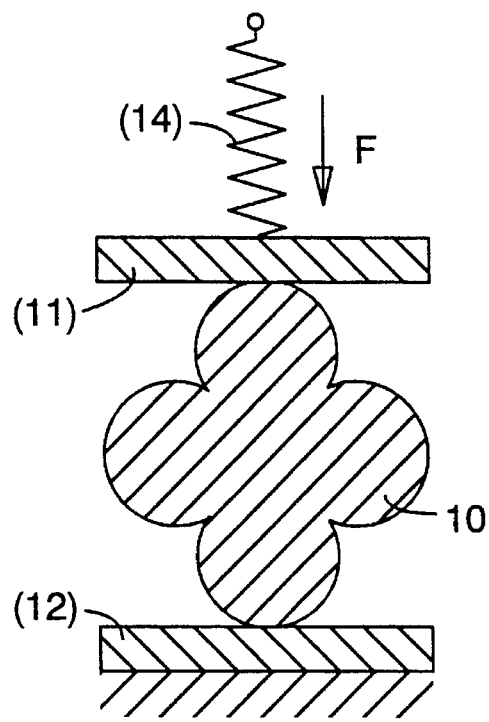

FIG. 17 illustrates an inventive device in which the electrically conductive elastomeric body (10) has a convex deformable abutment surface in a "spline configuration", comprising several integrated elastomeric bodies according to earlier Figures.

The elastomeric body (10) is thus coherent and several convex surfaces can be activated, for instance by increasing the pressure with the aid of the pressure device (14).

Figure 18A:
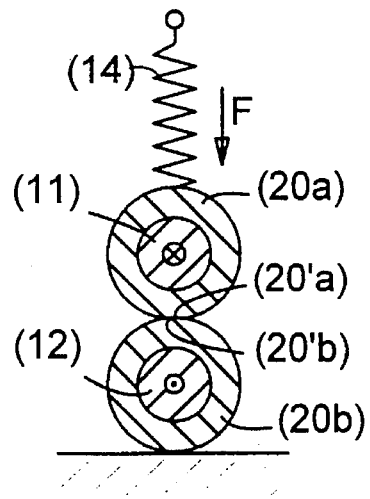
Figure 18B:
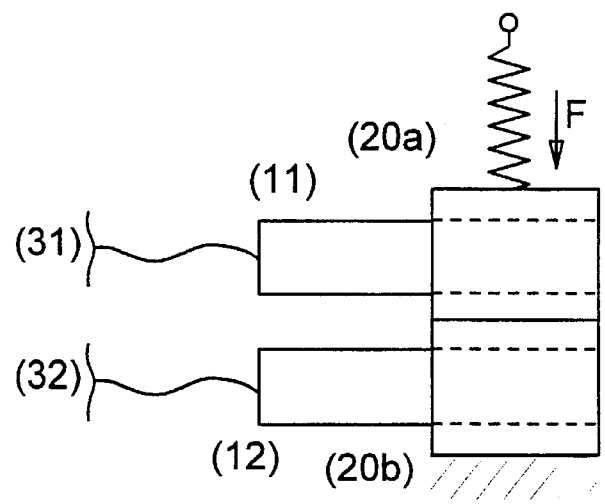

FIGS. 18a–b illustrate an inventive device which is comprised of two electrically conductive elastomeric bodies (20a, 20b) having convex deformable abutment surfaces (20a', 20b'), and two electrodes (11, 12) The electrodes are Surrounded by concentrical, electrically conductive elastomeric bodies (20a, 20b) whose abutment surfaces (20a', 20b') are in physical abutment with one another. The abutment surfaces (20a', 20b') are deformed by pressure exerted by a pressure device (14). The electrodes (11, 12) are provided with electrical connecting means (31) and (32) respectively.

Figure 19:
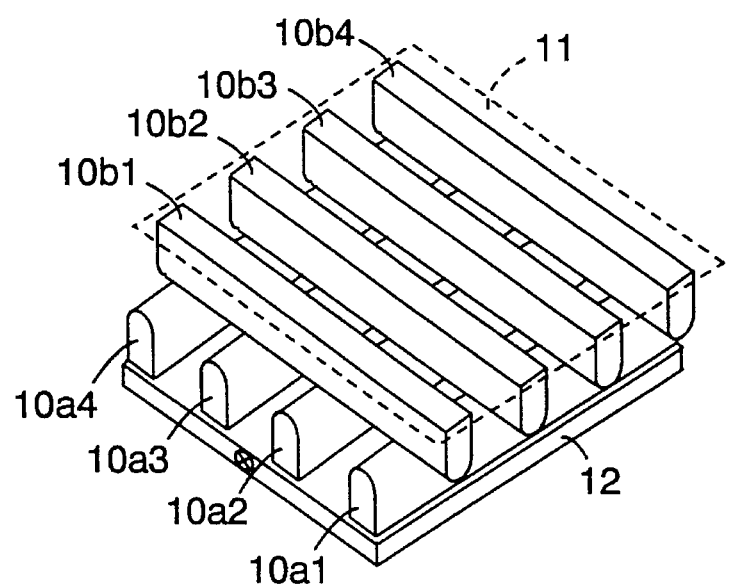

FIG. 19 illustrates an inventive device in which the electrically conductive elastomeric bodies (10a1, 10a2, 10a3, 10a4) have convex-defining surfaces which are orientated perpendicularly to the convex-defining surfaces of the electrically conductive bodies (10b1, 10b2, 10b3, 10b4). The device includes two electrodes (11, 12) for conducting current therethrough, electrodes on which a pressure device exerts pressure such as to deform the abutment surfaces (10a1 . . . 10b1 . . . ).

It will be understood that the invention is not restricted to the illustrated embodiments thereof and that more variants are conceivable within the scope of the following claims. For instance, the number of mutually stacked electrically conductive elastomeric bodies according to FIG. 8 may be considerably more than has been shown.

I claim:

1. A device for protecting against overcurrents in electric circuits comprising:

at least one electrically conductive body which is comprised of elastomeric material; and two electrodes which supply circuit current through the body and each of which is in abutment with the body at corresponding abutment surfaces, either directly or through the intermediary of an intermediate part, and in which abutment pressure is obtained through the medium of a pressure device, the electrodes being constructed so as to repel one another under the influence of overcurrents, the abutment surfaces decreasing as overcurrent passes through the body and at least one electrode/intermediate part being convex in a pressureless state but being deformed by the pressure device at respective abutment surfaces by the pressure exerted thereon.

2. The device according to claim 1, wherein the intermediate part is also comprised of elastomeric material.

3. The device according to claim 2, wherein the elastomeric body and the intermediate part have a Shore number between 20–80.

4. The device according to claim 1, wherein the pressure device is resilient.

5. The device according to claim 1, wherein the pressure device is a spring mechanism having two mechanically stable equilibrium states, on and off respectively, at least one of the electrodes being mechanically coherent with the spring mechanism for galvanic electrodes.

6. The device according to claim 1, wherein the pressure device is adjustable to adjust the applied abutment pressure.

7. The device according to claim 1, wherein the electrodes are provided with ferromagnetic circuits which function to amplify the repelling force between the electrodes.

8. The device according to claim 1, wherein elastomeric material is expanded over the electrodes.

9. The device according to claim 1, wherein the body is compressed by the pressure device to at least 5% when the body is homogeneous.

10. The device according to claim 9, wherein the pressure device functions to compress the body to 5%–40% when the body is homogeneous.

11. The device according to claim 1, wherein the body has a central cavity.

* * * * *

UNITED STATES PATENT AND TRADEMARK OFFICE
CERTIFICATE OF CORRECTION

PATENT NO. : 5,565,826
DATED : October 15, 1996
INVENTOR(S) : Per Olof KARLSTROM It is certified that error appears in the above-indentified patent and that said Letters Patent is hereby corrected as shown below:

On the cover page, insert the following information:

-- [62] Related U.S. Application Data

Continuation of PCT/SE93/00324, April 14, 1993.--

Col. 1, line 3, insert the following information after the title and before line 1:

-- This is a continuation of International Application PCT/SE93/00324, with an international filing date of April 14, 1993, now abandoned.--.

UNITED STATES PATENT AND TRADEMARK OFFICE
CERTIFICATE OF CORRECTION

PATENT NO.  : 5,565,826
DATED       : October 15, 1996
INVENTOR(S) : Per Olof KARLSTROM It is certified that error appears in the above-indentified patent and that said Letters Patent is hereby corrected as shown below:

On the cover page, please add the following information:

--     Foreign Application Priority Data
April 16, 1992 [SE]    Sweden..........9201223-6--.

Signed and Sealed this

Nineteenth Day of August, 1997

*Attest:*

BRUCE LEHMAN

*Attesting Officer*     *Commissioner of Patents and Trademarks*